United States Patent
Kreuter et al.

(10) Patent No.: US 6,838,639 B2
(45) Date of Patent: Jan. 4, 2005

(54) METHOD FOR THE MACHINING OF WORKPIECES BY MEANS OF SEVERAL LASER BEAMS

(75) Inventors: Rüdiger Kreuter, Darmstadt (DE); Ulrich Bielesch, Frücht (DE)

(73) Assignee: DataCard Corporation, Minnetonka, MN (US)

( * ) Notice: Subject to any disclaimer, the term of this patent is extended or adjusted under 35 U.S.C. 154(b) by 10 days.

(21) Appl. No.: 10/204,314

(22) PCT Filed: Feb. 15, 2001

(86) PCT No.: PCT/EP01/01708
§ 371 (c)(1),
(2), (4) Date: Feb. 4, 2003

(87) PCT Pub. No.: WO01/60560
PCT Pub. Date: Aug. 23, 2001

(65) Prior Publication Data
US 2003/0155336 A1 Aug. 21, 2003

(30) Foreign Application Priority Data
Feb. 15, 2000 (DE) .......................................... 100 06 516

(51) Int. Cl.$^7$ .............................................. B23K 26/00
(52) U.S. Cl. ............................. 219/121.76; 219/121.77; 219/121.85
(58) Field of Search ....................... 219/121.76, 121.77, 219/121.85, 121.78, 121.73

(56) References Cited

U.S. PATENT DOCUMENTS

| | | | | |
|---|---|---|---|---|
| 4,854,320 A | * | 8/1989 | Dew et al. ..................... | 606/3 |
| 4,947,023 A | * | 8/1990 | Minamida et al. ..... | 219/121.68 |
| 4,982,166 A | * | 1/1991 | Morrow ..................... | 359/349 |
| 5,139,494 A | * | 8/1992 | Freiberg ....................... | 606/3 |
| 5,540,676 A | * | 7/1996 | Freiberg ....................... | 606/3 |
| 6,150,629 A |   | 11/2000 | Sievers |   |

FOREIGN PATENT DOCUMENTS

| | | |
|---|---|---|
| CA | 1332445 | 10/1994 |
| DE | 39 04 287 A1 | 9/1989 |
| DE | 41 02 936 A1 | 8/1992 |
| DE | 195 44 502 C1 | 11/1995 |
| EP | 0 308 512 | 3/1989 |

* cited by examiner

Primary Examiner—M. Alexandra Elve
(74) Attorney, Agent, or Firm—Merchant & Gould P.C.

(57) ABSTRACT

In material machining by means of laser beams, in particular when engraving for example metal or when blackening and marking on plastic material, there is to be provided a process in which in spite of a high frequency of machining pulses the required minimum energy per pulse is achieved. For that purpose a plurality of laser beams are brought together by way of a beam-combining means and passed by way of a common beam-guide means on to the workpiece and in particular operated in time-displaced relationship.

25 Claims, 2 Drawing Sheets

Figure 1:
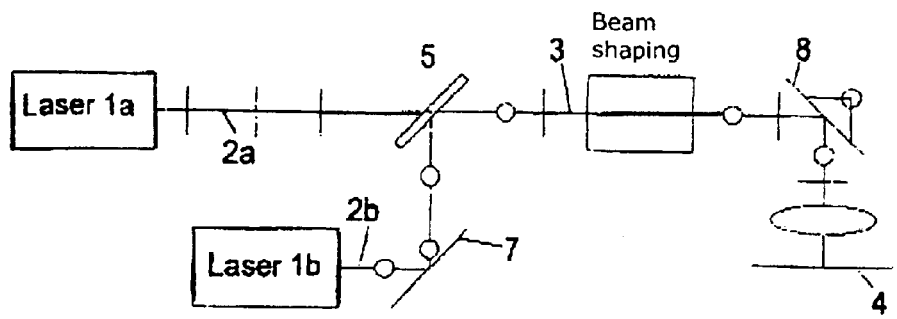

Simultaneous quality switching of both lasers
Signal for quality switching of laser 1a Signal for quality switching of laser 1b Laser power at the workpiece Alternate quality switching of both lasers Signal for quality switching of laser 1a Signal for quality switching of laser 1b Laser power at the workpiece Signal for quality switching of laser 1a Signal for quality switching of laser 1b Signal for quality switching of laser 1c Laser power at the workpiece Signal for switching the alternating optical element 6 (with $\lambda/2$ voltage)

METHOD FOR THE MACHINING OF WORKPIECES BY MEANS OF SEVERAL LASER BEAMS

The invention concerns a process for machining a workpiece by means of a plurality of laser beams at the same machining location.

Laser light is used industrially nowadays for various purposes:
- with very high energy density levels for welding or cutting very different, including very hard materials such as steel, and
- with energy density levels which are reduced in relation thereto, for engraving materials by vaporisation or by burning material on the surface of a substrate.

In that respect a special case is colouring for example plastic material from an initial colour to give a grey shade or black, which is used for producing image representations or labelling and inscriptions on plastic cards, for example credit cards, identity cards or similar plastic cards, but also on other substrates such as paper-like or textile-like materials such as for example passes.

The demands on the laser sources used and the ancillary devices thereof are correspondingly different.

When welding, flame-cutting and also in part also engraving—depending on the hardness of the material to be engraved—the greatest possible removal of material per unit of time is generally the consideration that is in the foreground, and therewith the requirement for a highest possible energy density level for the laser beam.

In that respect, the degree of absorption of the laser light, that is to say the absorption capability, in the material to be machined, plays a large part, which in part has a greater influence on the machining result than the laser output power.

Continuously operating lasers, so-called CW lasers, in comparison with a pulsed laser, introduce a low level of energy density per unit of time of the radiation, into the material of the workpiece.

In comparison, pulsed lasers implement a very much higher level of energy input into the material per unit of time of radiation, in which respect however the individual light flashes are only of a very short time duration. That can also be used to machine materials with a high melting point.

Production or maintenance of a suitable plasma cloud for the purposes of improving efficiency is actively used. For example it is known from EP-A-0 481 270 to implement material machining by means of a CW laser which is to be operated at low cost. The degree of absorption thereof and thus its efficiency are improved if a $CO_2$ pulsed laser is directed on to or, in the direction of advance, immediately in front of the machining location of the $CW-CO_2$ laser, wherein the pulse energy and pulse frequency of the pulsed laser are admittedly not sufficient to implement the desired machining operation, but are sufficient to produce a small plasma cloud at the machining location and thus to increase the actual machining effect produced by the $CW-CO_2$ laser.

In that case the $CO_2$ pulsed laser is brought together with the $CW-CO_2$ laser in a rearwardly operated beam divider and guided as a machining beam on to the workpiece, by way of a common beam-guide means and further optical system.

That evidently is effected without linear polarisation of the two laser beams.

It is further known that, in dependence on the angle of incidence, the absorption effect of a linearly polarised laser beam in the material of a workpiece is higher than the level of absorption in the case of a stochastically polarised or circularly polarised laser beam. It can therefore be worthwhile to linearly polarise such a for example stochastically polarised laser beam and thereby to use for example only 50% of its output energy as the machining quality is improved.

In the case of marking or labelling materials with a low melting point, for example plastic cards, the problem does not lie in producing the highest possible levels of energy density at the machining location, but rather in producing a machining advance which is as rapid as possible, that is to say an advance in terms of blackening, in order to minimise the time for the machining procedure, that is to say applying an image and/or labelling to such a plastic card.

In view of the fact that plastic cards of that kind are mass-produced articles whose individual price must be kept extremely low, but the cards can nonetheless only be individually successively labelled by a laser, amortisation of the expensive laser labelling apparatus in that respect has an overproportionally severe effect on the individual workpiece, over the machining period.

Plastic cards of that kind generally cannot be machined with CW lasers as the energy density required for the blackening effect is so high that, when using CW laser radiation, it results in burning of the card material.

In order to avoid the apparatus and financial expenditure involved in the use of pulsed lasers, and in particular the cooling installations thereof, costly wearing components such as flash lamps, high-voltage switches and the like, and in particular in order not to have to operate with the comparatively low pulse frequency of 30 to 2000 Hz, operation is effected with so-called quality-switched lasers (Q-switch lasers). Such a Q-switch laser is distinguished in that the quality of the resonator is altered (shuttered) and thus pulses are produced, whose energy density per unit of time within the laser pulse is markedly above the value involved in continuous operation. The advantage of these Q-switch lasers however lies in the high frequency of between 1000 and 100,000 pulses/second so that by rastering surfaces to be blackened, it is possible to operate at a relatively high operating speed.

However even that increased operating speed is subjected to limits by virtue of the fact that the energy introduced into the workpiece per pulse of the laser light decreases with a rising pulse frequency or rate. As a result it is not possible to use the theoretically attainable frequencies of up to 100 KHz in practice as, in the labelling procedure, a sufficient blackening effect is then no longer achieved or, in an engraving procedure, no material removal depth or an insufficient material removal depth is attained.

Therefore the object of the present invention is to provide a process for machining workpieces, in particular for engraving for example metal or for blackening plastic material, which in spite of a high sequence of machining pulses, affords the required minimum energy per pulse.

That object is attained by the features of claims 1 and 19. Advantageous embodiments are set forth in the appendant claims.

The attainment of a high pulse rate on the material with at the same time a high level of energy per pulse is achieved by coupling a plurality of and at least two laser beams to form a machining beam which is guided on to the workpiece by way of a common beam-guide means and beam-focusing means.

In that respect Q-switch lasers which are preferably linearly polarised approximately at a 90° angle relative to each other are preferably used as the laser sources. The beams are brought together by way of a beam-combining means, generally a rearwardly operated polarising beam splitter or a semitransparent mirror.

In this respect identical laser light sources are generally used, but that is not necessarily so:

Depending on the respective situation of use the different properties of the lasers with different wavelengths, for example infrared lasers (IR) on the one hand and ultraviolet lasers (UV) on the other can be deliberately utilised, which for example involve focusability of differing degrees and an energy density of differing magnitude per pulse:

As different materials require different energy density levels per pulse, for the same kind of machining by means of a laser, for example gradual blackening for labelling or producing grey scale images or material removal for engraving or cutting, it is possible to deliberately select lasers of a suitable wavelength for machining a given material if, within the same object to be machined, there are different materials, either present in spatially separated regions or in the form of a mixture. Furthermore the nature of the effects which can be achieved is also dependent on the wavelength of the laser. Thus IR lasers primarily produce thermal effects while UV lasers are capable of breaking up molecule bonds. In accordance with that effect, lasers of that kind which differ in respect of their wavelength can be used on the one hand for producing grey shades or black graduations by heating, and on the other hand for material conversion by breaking up molecular bonds. Material conversion can be used for example for producing colour effects, insofar as the reaction products achieved by breaking up a molecular bond can firstly produce a colour effect or can produce a different colour effect from the initial product.

When machining one and the same object, those different effects can also be used in respect of time at the same time or in succession, in respect of time in succession or at the same time, and in respect of space in juxtaposed relationship or at the same location.

Thus, particularly for use in succession in respect of time, it is possible firstly to use a thermal action as a preparatory measure for the main machining operation which is to be effected thereafter, or conversely it can serve for fixing a machining effect which has been previously achieved by the other laser.

Depending on the respective purpose of use the two lasers can be operated synchronously so that the pulses of the various lasers impinge simultaneously in the beam-combining means and thus also simultaneously on the workpiece. That results in an energy per pulse, which corresponds to the sum of the individual energies of the pulses of the individual laser sources and which, for example when carrying out an engraving procedure, results in an increased removal of material at the instantaneous machining location, that is to say it gives an increased engraving depth.

When blackening plastic material, for example only one grey shade is achieved with a single laser, while in the case of time-synchronous control of two or even more lasers a darker grey shade or black is produced.

It is here that the main advantage of using pulsed lasers becomes apparent precisely in regard to the production of grey scale images by the selective blackening of individual points on the surface:

As the machining beam goes by way of a beam-guide means which is also complicated and expensive from a mechanical point of view, for example direction-changing mirrors, in order to produce grey scales of the beam of a continuous (CW) laser, which is guided over the surface of the object, the speed of advance of the impingement point, accordingly therefore the speed of pivotal movement of the direction-changing mirrors involved and other mechanical components and so forth, would have to be altered. As those variations in speed would have to take place very rapidly in view of the very small image representations and the high levels of resolution required, considerable to insoluble problems would occur, in terms of suitable actuation of those mechanical elements.

When using a pulsed laser in contrast the speed at which the (pulsed) laser beam is moved over the object is kept constant, but instead the pulse frequency is varied, which affords a variation in the spacings of the blackened points and thus within the required level of resolution a variation in the grey shade of the surfaces being machined. If the variation in the pulse frequency indirectly causes an additional variation in the energy per pulse, that can be additionally taken into consideration as a compensating effect, when establishing the pulse frequency, or the excitation energy of the laser is suitably altered.

It should also be mentioned that it is not absolutely necessary to use linearly polarised lasers but it is equally well possible for a circularly polarised laser to be brought together with a linearly polarised laser. Coupled joint use of a continuous laser together with a pulsed laser is also a possibility.

In addition the focusability of differing quality, when occurs when dealing with lasers of different wavelengths, can be deliberately put to use:

When the object surface to be machined is at a spacing that is always the same from the focusing lens, lasers which can be focused to differing extents generally irradiate, downstream of the lens, image points or image surfaces which are of different size in regard to their area. For example, a relatively large image point is afforded when setting the object to the focus distance of the one laser beam from the lens for the other laser beam.

As however for reasons of superimposing individual blackened spot regions when effecting a material blackening operation and in particular producing grey scale images, the material is in any case not set precisely to the focus of the laser beams used, in order to achieve a finite size for the blackened point, such a spacing of the object relative to the lens which affords an approximately equal size of the blackened points for both laser beams can be set.

In general however the two different laser sources are actuated in such a way that they output their pulses in time-displaced relationship, that is to say alternately, and thus the time spacing between the impingement of two pulses on the workpiece can be for example selected to be only half as great as when engraving or labelling with only one laser. In that way, in this case the machining speed can be doubled and the time for producing a finished product, for example a labelled plastic card, can be halved.

Instead of Q-switch lasers it is also possible to use inexpensive diode lasers or other lasers with sufficient energy per pulse.

The pulse sequence on the workpiece and thus the machining speed can be further increased if more than two pulsed and polarised lasers are coupled to form a machining laser beam. For that purpose, as described hereinbefore, firstly a first and a second laser beam which are of differing linear polarisation are brought together by way of a beam-combining means. The partial machining laser beam comprising pulses of changing polarity is passed downstream of the beam-combining means through an active optical component, the purpose of which is to convert the linear polarisation of the one laser output beam into the linear polarisation of the other laser output beam, so that a partial machining beam of the same linear polarisation is produced.

That can be achieved by using an active optical component which is very well controllable in respect of time, for example a Pockel cell, which has that effect only upon electrical actuation, but otherwise passes the laser beam unchanged. If the Pockel cell is activated coupled in respect of time to always the same laser output beam, that laser output beam is always altered in respect of its linear polarisation, in which respect the Pockel cell is so selected that the change corresponds precisely to the difference between linear polarisations of the two output beams.

The partial machining beam which is homogeneously polarised in that way and which for example involves vertical polarisation can be fed with a further laser beam which involves linear polarisation that is then horizontal, by way of a further downstream beam-combining means. That can also take place a plurality of times in succession, once again after synchronisation of polarisation, by way of an active optical component, wherein after the last operation of bringing the beams together, there is no longer any need for adaptation of the polarisation of the two partial beams.

Figure 2:
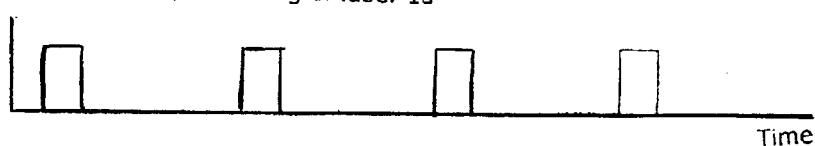
Figure 2:
Figure 2:
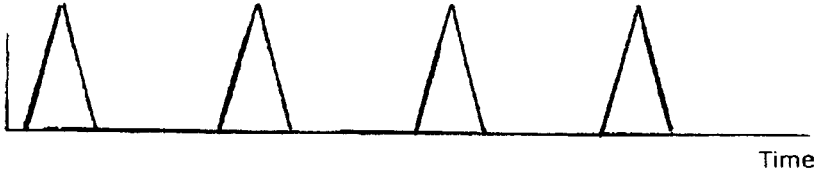
Figure 3:
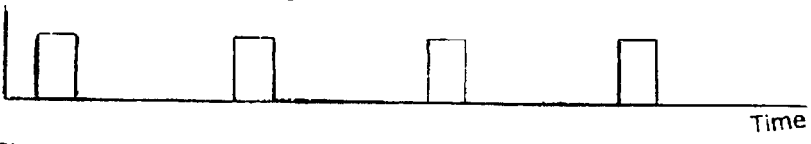
Figure 3:
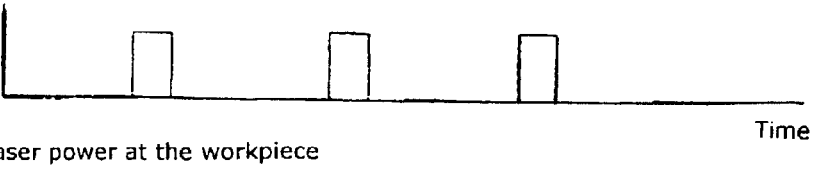
Figure 3:
Figure 4:
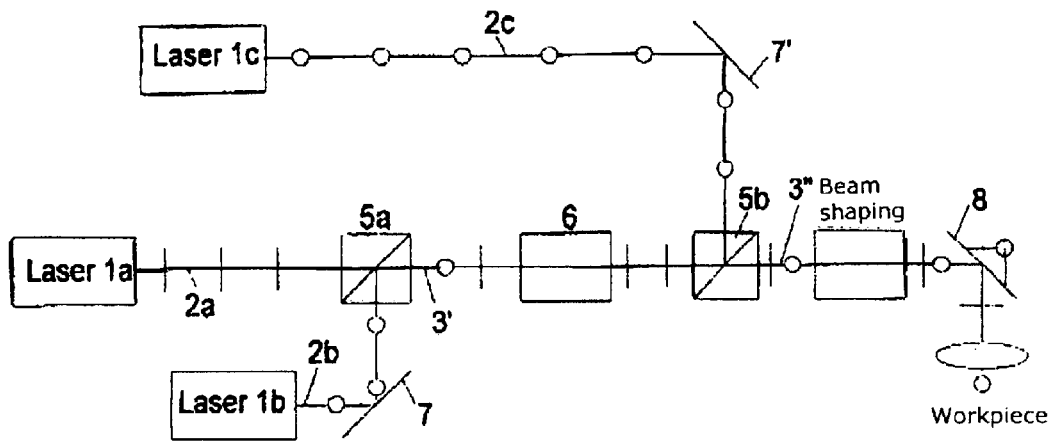
Figure 5:
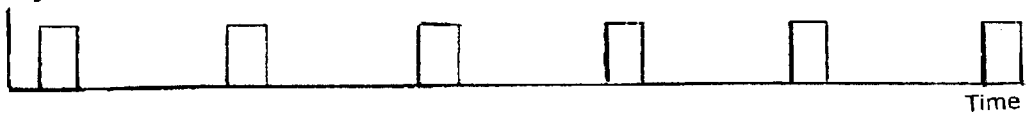
Figure 5:
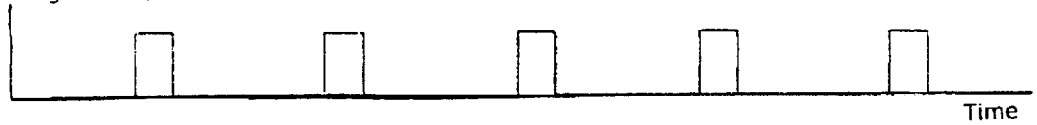
Figure 5:
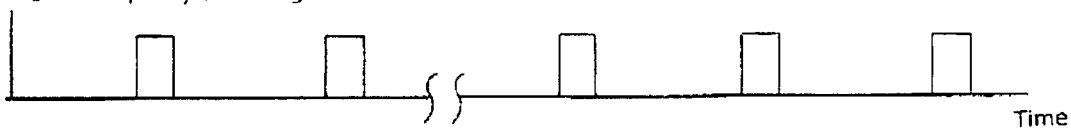
Figure 5:
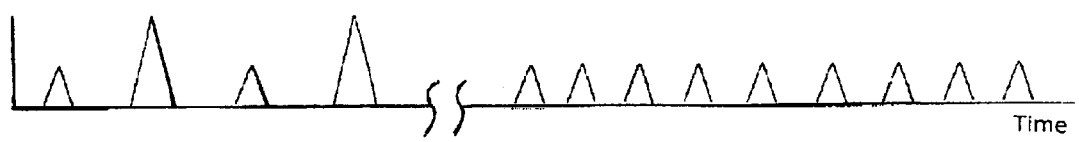
Figure 5:
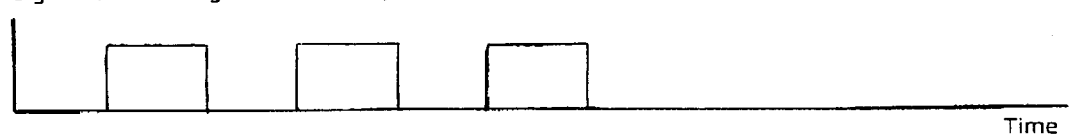

An embodiment according to the invention is described in greater detail hereinafter by way of example with reference to the drawings in which:

FIG. 1 shows an apparatus for producing a working beam formed from two laser sources, FIG. 2 shows diagrams relating to the time switching of the components, FIG. 3 shows diagrams for another time switching of the components, FIG. 4 shows an apparatus for coupling three laser sources to constitute a working laser beam, and FIG. 5 shows diagrams relating to time coupling of the components of FIG. 4.

FIG. 1 shows the two laser sources 1a, 1b which each output a respective laser beam 2a and 2b respectively. In this arrangement the laser beam 2a is polarised for example parallel to the plane of the sheet, symbolically represented by the transverse lines in the laser beam 2a, but in contrast the laser beam 2b is linearly polarised perpendicularly to the plane of the sheet, symbolically indicated by the circles in the laser beam 2b.

The two laser beams 2a, 2b are brought together at the beam-combining means 5, for example a semitransparent mirror, insofar as the one laser 1a passes through a semitransparent mirror while the laser beam 2a impinges at a right angle thereto at a 45° angle on to the inclined surface on to the semitransparent mirror and is thereby deflected through 90° and thus parallel to and in congruent relationship with the laser beam 1a passing through the mirror.

If originally the two lasers 1a and 1b are disposed in mutually parallel relationship, then the laser beam 2b is previously diverted by way of a mirror 7 at a 90° angle.

The machining laser beam 3 which is brought together in the beam-combining means 5 passes through a device for beam shaping and beam guidance which comprises one or more of the illustrated mirrors 8 which are in part pivotable, and after beam focusing impinges on the workpiece 4, in which case both partial beams of the superimposed machining laser beam 3 retain their original linear and mutually different polarisation.

FIG. 2 shows the first possibility of time switching of the two lasers 1a, 1b or their pulsed laser beams 2a, 2b:

The pulses are controlled in respect of time in such a way that they impinge in the beam-combining means 5 at the same time and with an identical travel distance length as far as there also leave the laser sources 1a, 1b at the same time. As a result the pulses also impinge on the workpiece 4 at the same time so that there particularly high energy values per pulse, corresponding to the sum of the energy values of a respective individual pulse of the laser beams 2a and 2b, impinge, although at a large spacing in respect of time.

FIG. 3 shows intermittent actuation of the laser sources 1a, 1b so that the pulses thereof arrive at the beam-combining means 5 in time-displaced relationship, in particular in uniformly time-displaced relationship, alternately, and thus also reach the workpiece 4 alternately in respect of time.

The consequence is lower levels of energy per pulse at the workpiece, but with half the spacing in respect of time, in relation to time synchronisation as shown in FIG. 2.

FIG. 4 shows an apparatus for machining by means of three laser beams 2a, b, c which are brought together:

The first two laser beams 2a and 2b from the laser sources 1a, 1b are brought together in a similar manner to FIG. 1. The partial machining beam 3' which issues from the beam-combining means 5a, in this case a prism, is then passed through an active optical component 6, for example a Pockel cell, which is activated only when for example a pulse of the laser beam 2b passes through that element so that the active optical component 6 changes the linear polarisation thereof into the linear polarisation corresponding to the laser beam 2a. The partial machining beam 3' which is homogeneously polarised in that way is combined in a further beam-combining means 5b with a further laser beam 2c from a laser source 1c. The newly added laser source 2c is also linearly polarised, but in turn differently to the homogeneously polarised partial beam 3', more specifically for example in the same direction as the laser beam 2b.

In this case also—with a parallel positioning for the original laser sources 1a, b, c—before the laser beams 2b, 2c are introduced into the beam-combining means 5a and 5b, the arrangement produces a change in direction through 90° by way of suitable mirrors 7, 7' into the beam-combining means 5a and 5b respectively in order to produce equal optical travel lengths, while occupying a small amount of space.

The machining laser beam 3" issuing from the second beam-combining means 5b comprises pulses of different linear polarisation and is no longer homogeneously polarised. Before impinging on the workpiece 4 it only still passes through the obligatory devices for beam shaping, for beam guidance, comprising one or more deflectable mirrors 8, and for beam focusing.

In addition account must be taken of the fact that it is not sufficient for the beams produced by the individual lasers to be guided exactly parallel by way of the correct angular positioning of the direction-changing mirrors and prisms and so forth, but the beams must be guided in congruent relationship as any displacement also results in a displacement of the regions of action produced on the object by the different laser beams, for example blackened points. As that problem is also influenced by differing degrees of thermal expansion of different mechanical components which are involved in beam guidance, one of the countermeasures provides that the optical travel distance length of the different laser beams, to the point at which they are brought together, is selected to be exactly equal.

FIG. 5 shows control in respect of time:

If the lasers 1a and 1b are operated alternately in respect of time so that their pulses impinge alternately in mutually time-displaced relationship on the first beam-combining means 5a, current occurs at the active optical component 6, for example the Pockel cell, and activates same, only when a pulse of the second laser beam 2b passes therethrough.

The duration of activation of the optical components 6 is in that case greater than the duration of quality switching of the laser beam to be influenced so that the duration thereof is reliably within the duration of activation of the optical component 6. The laser beam which is last coupled in, for example the beam 2c, no longer has to be subjected to a polarisation equalisation effect, with the other machining beam.

There is also freedom of choice for that last laser beam 2c, in regard to time-synchronous or time-displaced control of the pulse sequence of that last laser beam 2c, in relation to the other laser beams 2a, 2b. It is also possible, during machining, to change over from a time-synchronous mode to a time-displaced mode and vice-versa.

As the illustrations in the lower part of FIG. 5 show, in this case, as described with reference to FIG. 2 or 3, it is again possible to implement the two possible options of a greater or smaller frequency of impingement of pulses on the object, in which respect the higher frequency results in a lower level of energy per pulse and vice-versa. This can also be deliberately used for the desired working result, for example the degree of blackening of a grey scale image, at the respective location.

In that way its light which is linearly polarised for example perpendicularly to the plane of the sheet is converted into light which is polarised in parallel relationship with the plane of the sheet, corresponding to the linear polarisation of the laser la, so that, at the output of the active optical component 6, there is a homogeneously polarised pulsed laser beam, that is to say with pulses which all involve the same linear polarisation. As described above that linearly polarised laser beam 3' can be brought together with a third laser beam 2c by way of a further beam-combining means. The laser beam 3" which is obtained from three laser beams can now be guided on to the workpiece as described above. Further lasers can be coupled thereto by the alternate use of further components for the purposes of deliberate polarisation alteration and beam combination.

List of References

| 1a, 1b, 1c | laser sources |
| 2a, 2b, 2c | laser beams |
| 3 | machining laser beams |
| 4 | workpiece |
| 5 | beam-combining means |
| 6 | active optical component |
| 7 | mirror |
| 8 | mirror |

What is claimed is:

1. A process for machining a workpiece using a machining laser beam, comprising:
    bringing at least two laser beams together using a beam-combining mechanism;
    passing the combined two laser beams through a beam-guide and to the workpiece; and
    wherein the laser pulses of the individual laser beams can be changed over in their time succession relative to each other from synchronous to time-displaced and vice-versa.

2. A process according to claim 1, wherein the at least two laser beams are guided to the same target point.

3. A process according to claim 1, wherein the at least two laser beams are guided within the beam-guide in a parallel relationship and in congruent relationship.

4. A process for machining a workpiece using a machining laser beam, comprising:
    bringing at least two laser beams together using a beam-combining mechanism;
    passing the combined two laser beams through a beam-guide and to the workpiece; and
    wherein the laser beams are discontinuous laser beams and originate from different laser sources which discontinuously output the light and the light pulses arrive in the beam-combining mechanism simultaneously and impinge on the workpiece simultaneously.

5. A process for machining a workpiece using a machining laser beam, comprising:
    bringing at least two laser beams together using a beam-combining mechanism;
    passing the combined two laser beams through a beam-guide and to the workpiece; and
    wherein the laser beams are discontinuous laser beams and originate from different laser sources which discontinuously output the light and the light pulses of the two laser sources arrive in the beam-combining mechanism and impinge on the workpiece in mutually time-displaced relationship.

6. A process according to claim 4, wherein the laser sources are quality-switched lasers whose energy per light flash decreases overproportionally with increasing frequency.

7. A process according to claim 1, wherein the laser beams are linearly polarised laser beams with a polarisation plane turned through 90° relative to each other.

8. A process for machining a workpiece using a machining laser beam, comprising:
    bringing together at least three laser beams so that the laser beams jointly form the machining laser beam, wherein the laser beams are brought together by:
        bringing together a first discontinuous laser beam and a second discontinuous laser beam in a beam-combining mechanism in mutually time-displaced relationship to form a partial machining beam,
    passing the partial machining beam through an active optical component which can alter the linear polarisation of the partial machining beam and which is activated whenever the first or second laser beam impinges on the active optical component and thereby alters its polarisation to the polarisation of to other laser beam, but is deactivated when the other laser beam impinges on the component,
    bringing together the linear polarized partial machining beam and a further laser beam in a further beam-combining mechanism to form the machining laser beam, the further laser beam having a linear polarisation that differs from that of the partial machining beam, and
    passing the machining laser beam through a beam-guide and to the workpiece.

9. A process according to claim 8, wherein the partial machining beam is passed through a further active optical component which is capable of altering the linear polarisation of the further laser beam to the linear polarisation of the partial machining beam, whereby a machining laser beam with the linear polarisation of the first laser beam is produced.

10. A process according to claim 8, wherein the active optical element is a Pockel cell.

11. A process according to claim 8, wherein the active optical element is a Kerr cell.

12. A process according to claim 8, wherein the active optical element is a magneto-optical modulator which operates fur example on the basis of the Faraday effect or an acousto-optical modulator which changes the polarisation by the action of a sound wave field.

13. A process according to claim 8, wherein the active optical element utilises the birefringence which is produced in certain materials by mechanical loading, and the workpiece comprises a material that is a uniaxial transparent crystal.

14. A process according to claim 8, wherein after the last bringing-together of a partial machining beam and a last original laser beam, they no longer pass through any further active optical element which alters linear polarisation.

15. A process according to claim 4, wherein the laser sources emit laser beams of the same wavelength.

16. A process according to claim 4, wherein the laser sources are laser sources of the same kind.

17. A process according to claim 1, wherein the laser beams have impressed thereon a linear polarisation.

18. Apparatus for machining a workpiece using a machining laser beam, comprising:
    at least two laser sources producing at least two laser beams,
    at least one beam-combining mechanism,
    at least one beam-guide arranged downstream of the beam-combining mechanism for guiding the laser beams of the laser sources in a direction towards the workpiece, and
    wherein the optical path length from the laser sources to a coupling point in the beam-combining mechanism is equal.

19. Apparatus according to claim 18, wherein the laser sources are arranged in a mutually parallel position.

20. Apparatus according to claim 18, further comprising an adjustable direction-changing mirror arranged in the beam path of at least one of the laser beams.

21. Apparatus for machining a workpiece using a machining laser beam comprising:
    at least two laser sources producing at least two laser beams,
    at least one beam-combining mechanism,
    at least one beam-guide arranged downstream of the beam-combining mechanism for guiding the laser beams of the laser sources in a direction towards the workpiece; and
    wherein the beam-combining mechanism is pivotable about an axis parallel to an axis that is parallel to the direction of the laser beam just passing therethrough.

22. Apparatus for machining a workpiece using a machining laser beam, comprising:
    at least two laser sources producing at least two laser beams,
    at least one beam-combining mechanism,
    at least one beam-guide arranged downstream of the beam-combining mechanism for guiding the laser beams of the laser sources in a direction towards the workpiece; and
    wherein the beam-combining means is pivotable about an axis that is parallel to an axis perpendicular to the direction of the laser beam just passing therethrough.

23. Apparatus according to claim 18, further comprising at least one pivotable mirror arranged in the beam path downstream of the beam-combining mechanism.

24. Apparatus according to claim 23, further comprising a beam shaping unit arranged in the beam path downstream of the beam-combining mechanism and upstream of the mirror.

25. Apparatus according to claim 23, further comprising a lens arranged downstream of the mirror, wherein the lens is stationary and is of such a large diameter that the laser beams pass through the lens even upon maximum deflection of the mirror.

* * * * *